UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

GREEN ANTHRAQUINONE DYES AND PROCESS OF MAKING THEM.

1,077,115.      Specification of Letters Patent.      Patented Oct. 28, 1913.

No Drawing.      Application filed June 5, 1913. Serial No. 771,896.

*To all whom it may concern:*

Be it known that I, OSCAR BALLY, a citizen of the Swiss Republic, residing at Mannheim, Germany, have invented new and useful Improvements in Green Anthraquinone Dyes and Processes of Making Them, of which the following is a specification.

The specification of Patent No. 856,811 describes the production of coloring matters by heating 2.2'-dimethyl-1.1'-dianthraquinonyl, or a homologue or a derivative thereof. The simplest coloring matter thus obtainable is known in commerce as "indianthrene gold-orange G in paste." I have now found that by acting on this coloring matter, or on a homologue or derivative thereof, with nitric acid, or other nitrating agent, in the presence of a suitable organic diluent, I can obtain new compounds which, either directly or after first being reduced to the amino compound, can be dissolved in the vat and will dye vegetable fiber brilliant green shades. Since in the vat the nitro group, or groups, is, or are, reduced to the amino group, or groups, so that the coloring matter which finally remains on the fiber contains one, or more, amino group or groups, and no nitro groups, the nitro compounds are equivalent to the amino compounds for the purposes of this invention.

My new compounds are recognizable by containing nitrogen and by being insoluble in dilute acids and alkalis, but soluble in alkaline hydrosulfite, yielding vats which dye cotton green shades and these shades, on treatment with strong calcium hypochlorite solution, become brown.

The following example will serve to illustrate further the nature of my invention and how it can be carried into practical effect, but the invention is not confined to this example. Suspend 5 kilos of the coloring matter obtainable by heating 2.2'-dimethyl-1.1'-dianthraquinonyl in 50 kilos of nitrobenzene and add, at ordinary temperature, 5 kilos of fuming nitric acid. Then warm for 10 hours on the water-bath, allow the reaction mixture to cool, filter off the coloring matter and wash it with nitrobenzene and alcohol, and dry it. It is an orange-yellow crystalline powder and is chiefly a mononitro compound. It can easily be reduced by means of sodium sulfid into the corresponding amino compound which yields a blue-violet solution in concentrated sulfuric acid and dyes cotton, in a hydrosulfite vat, brilliant fast green shades. If desired, the reduction of the nitro compound can be effected in the vat itself. If a larger quantity of nitric acid be employed, a dinitro compound is obtained and this yields somewhat yellower shades of green when applied to the fiber.

Now what I claim is:—

1. The process of producing coloring matters of the anthraquinone series by treating with a nitrating agent, in the presence of an organic diluent, a coloring matter which can be obtained by heating a 2.2'-dimethyl-1.1'-dianthraquinonyl compound.

2. The process of producing coloring matters of the anthroquinone series by treating with a nitrating agent, in the presence of an organic diluent, and then reducing, a coloring matter which can be obtained by heating a 2.2'-dimethyl-1.1'-dianthraquinonyl compound.

3. The hereinbefore described new coloring matters of the anthraquinone series obtainable from the product producible by heating a 2.2'-dimethyl-1.1'-dianthraquinonyl compound, which new coloring matters contain nitrogen, are insoluble in dilute acids and alkalis, are soluble in alkaline hydrosulfite yielding vats which dye cotton green shades, which shades, on treatment with strong calcium hypochlorite solution, become brown.

4. The hereinbefore described new coloring matter of the anthroquinone series obtainable by nitrating, in the presence of nitrobenzene, and then reducing, the product producible by heating 2.2'-dimethyl-1.1'-dianthraquinonyl, which new coloring matter contains nitrogen, is insoluble in dilute acids and alkalis, but yields a blue-violet solution in concentrated sulfuric acid, and is soluble in alkaline hydrosulfite yielding a vat which dyes cotton green shades, which shades, on treatment with strong calcium hypochlorite solution, become brown.

In testimony whereof I have hereunto set my hand in the presence of two subscribing witnesses.

OSCAR BALLY.

Witnesses:
J. ALEC. LLOYD,
JOSEPH PFEIFFER.